Jan. 4, 1966  J. B. THOMAS  3,226,808
METHOD OF MAKING REFRIGERATOR EVAPORATORS OR THE LIKE
Filed May 26, 1960  3 Sheets-Sheet 1
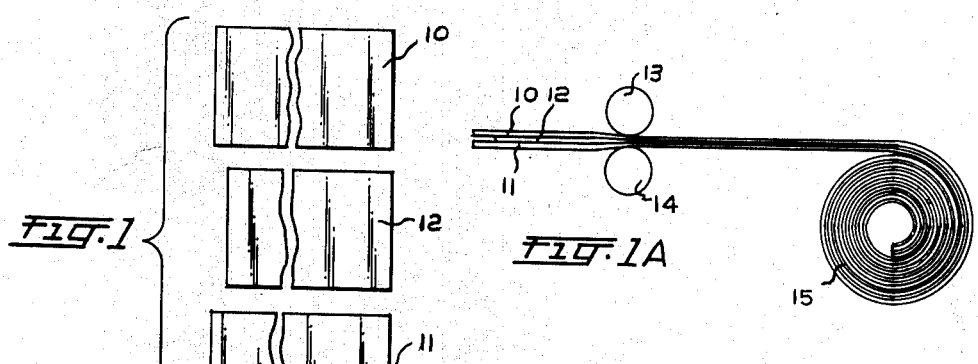
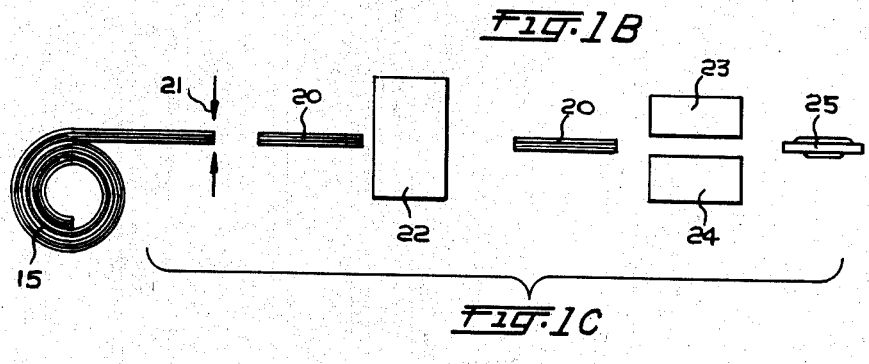
Inventor
JESSE B. THOMAS
By Glenn & Jackson
Attorneys

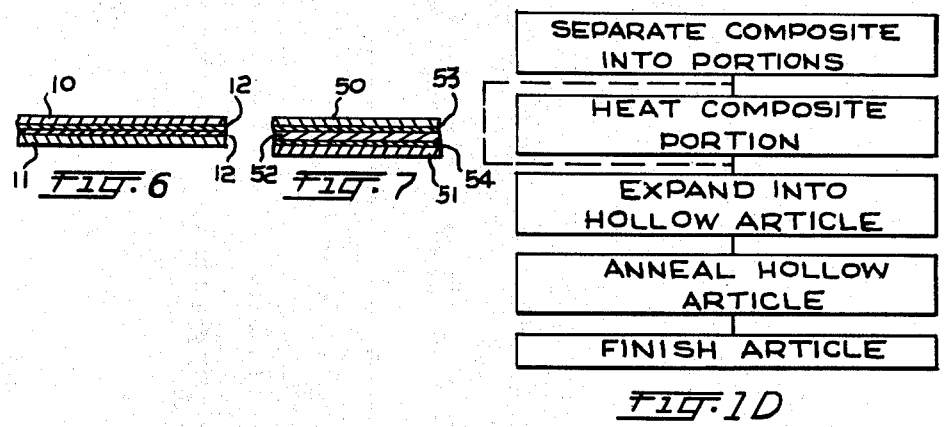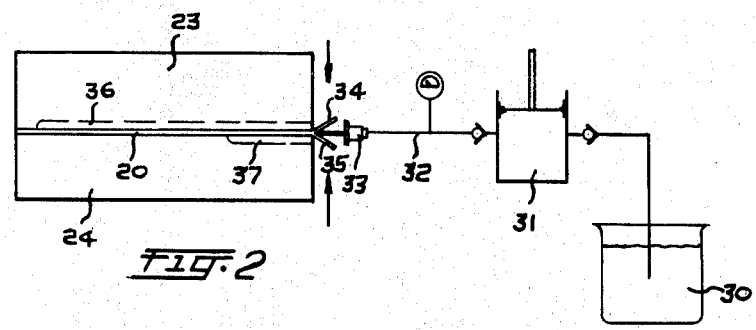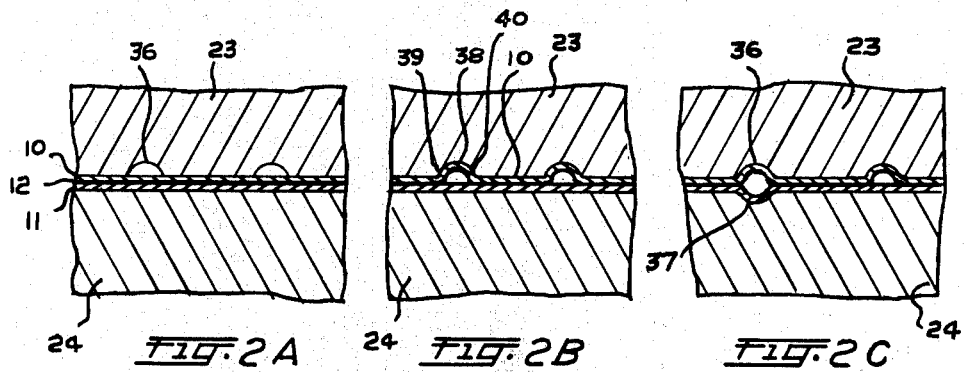

INVENTOR.
JESSE B. THOMAS

United States Patent Office 3,226,808
Patented Jan. 4, 1966

3,226,808
METHOD OF MAKING REFRIGERATOR
EVAPORATORS OR THE LIKE
Jesse B. Thomas, Henrico County, Va., assignor to Reynolds Metals Company, Richmond, Va., a corporation of Delaware
Filed May 26, 1960, Ser. No. 31,996
6 Claims. (Cl. 29—157.3)

This is a continuation-in-part of application Serial No. 762,648, filed September 22, 1958.

This invention relates to an improved refrigerator evaporator and the like, and to an intermediate composite sheet from which the refrigerator evaporator is formed and to the method for forming the composite and the refrigerator evaporator. More specifically, it relates to an improvement in the art of manufacturing refrigerator evaporators wherein a pressure fluid is applied internally to a blank for shaping that blank into a desired form having a hollow space therein.

In recent years several methods of manufacturing refrigerator evaporators have been proposed. One such method is to place a bond preventing material called stop-weld on a metal sheet in a pattern to correspond to the conduit pattern described in the evaporator. Another metal sheet is fastened to the first and the composite is reduced in thickness by a rolling operation which simultaneously bonds the sheets together in all areas except those prevented from bonding by the stop-weld. A fluid is then introduced under pressure between the sheets at the unbonded areas and the sheets are thereby expanded to define passageways in these areas. The expansion is limited by two thick flat restraining plates. The present invention overcomes many of the difficulties and limitations inherent in the above method and other known methods as will be apparent to those skilled in the art after reading the disclosure herein.

Another object of this invention is to provide an improved refrigerator evaporator.

Another object is to provide an intermediate composite sheet from which refrigerator evaporators may be fabricated.

Another object of the present invention is to provide an improved multi-layer metallic composite from which refrigerator evaporators and other metal articles having a hollow space integral therewith may be fabricated.

Another object is to provide an improved method for forming multi-layer metallic composites in a substantially continuous manner.

Another object is to provide an improved metal article having a hollow space integral therewith.

A further object is to provide an improved method for forming metal articles having a hollow space integral therewith from a multi-layer metallic composite.

A further object is to provide a multi-layer composite material having the bond strength between the layers greater than the strength of one or more of the intermediate layers.

A still further object is to provide a multi-layer composite material having an intermediate area of substantially less strength than outside areas after the composite has been greatly reduced in thickness by rolling from a composite having a much greater thickness than the finished composite.

Other objects and advantages will become more apparent as the description proceeds and when considered in conjunction with the accompanying drawings in which:

FIG. 1 is a diagrammatic view of several layers of sheet prior to being formed by one method into the composite representing an intermediate article of manufacture.

FIG. 1A is a diagrammatic view illustrating the forming of the composite into a rolled shape.

FIG. 1B is a chart illustrating a suitable sequence of steps in manufacturing the composite.

FIG. 1C is a diagrammatic view illustrating the movement of material in forming a finished article from a stock of the composite.

FIG. 1D is a chart illustrating one of the preferred sequence of steps in manufacturing an article from a stock of composite.

FIG. 2 is a diagrammatic view showing a press and expanding fluid system arrangement for forming the hollowed article.

FIG. 2A is a detail view to a larger scale showing a die arrangement in a press with a portion of a composite in place and prior to expansion.

FIG. 2B is a view similar to FIG. 2A and following expansion.

FIG. 2C is a view similar to FIG. 2A and showing an expansion of the composite on two sides.

FIG. 6 is an enlarged sectional view of a modification of the multi-layer composite.

FIG. 7 is an enlarged sectional view of a second modification of the multi-layer composite.

Figure 4:
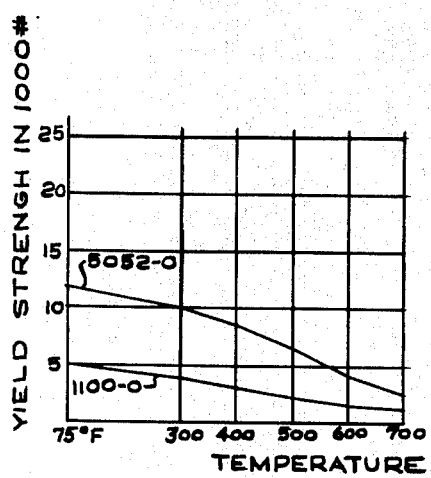
FIG. 4 is a graph showing the relationship of yield strength and temperature of two materials suitable for use as layer materials in the composite.

In carrying out the invention, an elongated ribbon of multi-layer metallic material is produced and comprises a source of composite stock from which smaller portions are later taken in preparation for fabricating the refrigerator evaporator or other hollow metal article.

The several layers which make up this stock are preferably bonded together with a substantially uniform metallurgical bond and include metals and alloys of metals which are compatible for this purpose.

The term metallurgical bond is familiar to those skilled in the art as being a bond between metallic surfaces which is other than a bond solely mechanical in nature. In the present case the metallurgical bond is usually a solid phase metallurgical bond produced by rolling two metal surfaces together with a sufficient reduction in thickness of the metal so as to cause the surfaces to become elongated and in intimate contact with one another.

This is called a solid phase bond because the surfaces never become liquid. If the metal is rolled below the recrystallization temperature, the metal becomes cold worked with an increase in internal thermodynamic energy, strength and hardness and a decrease in its ability to be elongated before breaking. If this metal is heated above the recrystallization temperature for a sufficient period of time, new crystals are formed which in many cases, depending on the metals involved, cross over the bond area to usually increase the strength of the bond and obliterate the bond line. Following this recrystallization heat treatment the metal is in an annealed condition with the effects of the cold working removed. This is, the thermodynamic energy, strength and hardness are reduced and the ability to elongate before rupturing is increased.

Another factor sometimes important is solid phase metallurgical bonding is diffusion. This is specifically used in some instances in the present invention as will appear hereinafter. If two metals are placed in intimate contact with one another which are of different composition, either because of alloying ingredients or because the base metals are different, they will have a tendency to diffuse one into the other so as to assume the same composition. Some metals will diffuse at room temperature but this diffusion is usually negligible. The rate of diffusion differs widely with different metals but increases greatly with a rise in temperature and also increases with an increase in time and an increase in the differences in concentration of the diffusing material. A specific example developed for this invention is where relatively pure aluminum is bonded to aluminum having 0.8 to 6 percent magnesium alloyed therewith. If this composite is heated to a sufficient temperature for a sufficient time, which factors are available to those skilled in the art, the magnesium will diffuse into the relatively pure aluminum to alloy therewith. The result is that the bond line is obliterated and the metal composition varies across the bond zone from a point of high magnesium content gradually decreasing percentagewise to the point that no magnesium is present. Since the magnesium content will increase the strength of the aluminum, the pure aluminum will be weaker than the bond zone and much weaker than the magnesium alloy. The use that is made of this relationship will appear more clearly later herein and is, of course, not limited to aluminum nor to magnesium additions thereto; all that is required is that the metals be compatible and that the diffusion ingredient increases the strength of one of the metals so that the metal is weaker than the bond zone and weaker than the metal from which the diffusion took place.

Whereas the composite herein is usually made from relatively thick plates which are elongated and metallurgically bonded by rolling, the composite may also be initially made by casting one or more of the outer layers onto the inner layer followed by rolling this composite to elongate it. This will only be satisfactory when the temperature of the metal being cast is less than the melting point of the inner layer unless such inner layer is continuously cooled by some auxiliary means. In all of the examples given herein and in most cases in actual practice, the inner weaker layer has a higher melting point than that of the outer layers.

An inner layer of the composite is characterized by being weaker than the outer layers such that under the conditions of fabrication, it will split apart either in itself or in the bond zone before the outer layer ruptures. In some instances the bond zone is made stronger than the inner layer such as by a diffusion of magnesium thereinto so that the splitting will substantially all take place in the inner layer and substantially none will take place in the bond zone. This is advantageous in many cases and is especially valuable when it is desired that the inner layer be of a material having characteristics such that it is more favorably disposed from a corrosion standpoint or otherwise towards the environment it is to be subjected to than the outer layers. Also, when the splitting is confined to the inner layer, the splitting strength is much more easily controlled and predicted than when the splitting takes place to a significant degree in the bond zone. One of the most important aspects of this invention is that the original composite can be many times thicker than the final composite and by a suitable selection of the inner layer's thickness will still have a definite zone of weakness after being reduced. This aspect is of its greatest importance when the composite's original thickness is more than fifteen (15) times the thickness of the final composite.

As used herein "bond line" refers to a sharp distinct line where two surfaces are bonded and "bond zone" refers to the area on each side of the original bond line affected by the bonding mechanism which areas is less well defined than the original bond line.

When making refrigerator evaporators or other articles from the composite the inner layer is split apart in the areas where hollow sections for circulation of the refrigerant are desired therein. In carrying out this splitting it is first necessary that an opening be provided in the composite to connect with the inner layer. This opening can either be provided by preventing bending from taking place originally or, preferably, it is provided by inserting a needle into the inner layer at the edge of the composite. Into this opening is inserted a hollow expansion needle connected to a fluid pressure source. The expansion needle is held tightly in the opening and clamped therein if necessary. The composite has external pressure applied in areas bordering the areas where hollow sections are desired. All the areas where hollow sections are desired must be joined to the opening wherein the expansion needle is disposed, either directly or through interconnection with an area so joined. The splitting action is initiated and governed by the application of a fluid through the expansion needle having a sufficient pressure to cause the composite to split apart at the weak inner layer but at an insufficient pressure to overcome the combined forces of the composite's resistance to splitting and the external pressure applied adjacent the areas in which splitting is desired.

The external pressure is usually and preferably applied by confining the composite between holding dies having surfaces which restrict or block the splitting action with either or both of the dies having a configurated recess into which the unrestricted portion of the composite may stretch or elongate. As the volume of the expanding fluid is introduced through the expansion needle, the composite begins to stretch into the die recess, the inner layer splits apart progressively and the working stresses are distributed upon that layer of the composite moving into the die recess. Thus, no focusing of stress occurs initially at any one portion of the layer which is moving into the recess and the necking-down problem, as previously found at boundaries between bonded and unbonded layers in articles formed by previous methods, is eliminated. The splitting action moreover may be conducted under normal or under elevated temperatures. Following and during the fabrication of the hollow metal article the inner periphery of the hollow space therein is surrounded by an unsplit inner layer.

Referring now to FIG. 1, the constituent parts from which the composite sheet is made are shown as comprising three elongated layers of metal having equal width, but not necessarily of the same length. Although at least three layers are required, the invention is not necessarily limited to this number as a maximum. As an illustration, the invention is hereafter described as employing aluminum and aluminum alloys which are materials well suited for and frequently employed in making hollow metal articles, but it will be understood that other metals and combinations thereof such as copper, silver, titanium and stainless steel, for example, may be used for certain purposes in accordance with the invention and without departing from the teachings thereof.

In making the composite, a sheet 10 of a suitably treated metal but with a width commensurate with size of the article ultimately to be formed and with a length greatly in excess of that width, is provided to serve as one of the outer layers of the composite. Another such sheet 11 which need not be of the same metal as sheet 10 nor of the same thickness, but which preferably is of the same width and length however, is provided to serve as the other outer layer of that composite. In addition, a third or inner sheet 12 of metal characterized by a consistently lower strength than either of sheets 10 and 11 and, in some cases, lower than the strengths of the bonds between sheet 12 and the adjacent sheets, is provided to serve as the splittable layer in the combination. Inner sheet 12 is of such initial thickness as to provide in the completed composite a final thickness of not less than about 0.0001 inch and preferably within the range of 0.0040–.020 inch. The width of sheet 12 is the same as that of the companion sheets, but generally the length of the same is about 5% smaller since during fabrication of the composite the elongation or rolloff of that inner layer will be greater due to its lower yield strength.

Referring now to FIG. 1B wherein a chart of the several steps of manufacturing the composite is shown, it will be understood that variations may be made therein without departing from the invention and that the following example of one satisfactory process is illustrative and not restrictive.

*Example A*

In making a composite of the type shown in FIG. 6, two sheets 10 and 11 of 5083 aluminum alloy and two sheets 12 of 1199 aluminum alloy upon being rolled to proper gauges were annealed at 750° F. for one hour and upon cooling, the facing surfaces of the sheets, were wire brushed dry. Upon being reheated to 750° F. for one hour, one of each of sheets 12 was placed in juxtaposed relation to the respective sheets 10 and 11 and cladded thereto with about 10–15% reduction in overall thickness of the contacting sheets during hot rolling thereof. This served to alleviate folding of the softer alloy and blister formation in subsequent treatments and gave a thickness of about 0.125 inch for the thus joined sheets. Each of the thus formed cladded sheets was then annealed at 750° F. for one hour, facing surfaces were brushed dry, and upon being placed in juxtaposed relation with the core surfaces in contact, the sheets were tack-welded together at the front corners. This assembly was then reheated to 850° F. for one hour. The hot assembly was then passed through rolls and reduced to an overall thickness of 0.060 inch, fifty percent of the reduction occurring during first passage through the rolls. Thereafter, the composite articles were annealed at 750° F. and slowly cooled for one hour to room temperature, whereupon it was stored for future use.

Considering now FIG. 1A, when it is described to form the composite with either the single inner layer 12 or with two layers 12, each bonded to an outer layer as described in Example A, or even with two spaced inner layers as exemplified by FIG. 7, the elongated composite upon passing from the reducing rolls 13 and 14 may be wound in a spiral roll 15. This roll may then be annealed and cooled and stored for future use.

The roll 15, as will be noted, contains sufficient stock material to form a plurality of hollow articles and the composite in the roll is flexible enough to permit the roll to have a compact spirally wound form. If desired, the bonded composite leaving the rolls may be collected and stored in any other suitable way, not being limited to collection in the form of a spiral roll.

As will now be apparent, the passage of the several juxtaposed layers between the rolls not only elongates the original layers 10, 11 and 12 which may be as long as handling machinery can handle but also forms a strong metallurgical bond between the inner layer or layers 12 and the layers 10 and 11 adjacent thereto. Such bonds extend across the entire inner surfaces of those layers and have the characteristic of being uniform along any one surface. After preliminary preparation of the layers for such bonding, the formation of the composite roll 15 is continuous and that roll provides a stock source from which many portions may later be cut, for making the ultimate metal articles. Thus, I have provided a method whereby a large stock of composite sheet made under carefully controlled conditions, and each portion of which is uniform, may be made available for manufacture of hollow metal articles. By contrast, when articles are made from sheet stock which is elongated with a stopweld pattern therein, each such piece of sheet stock must usually pass discontinuously through the process and each must be handled separately.

Figure 5:
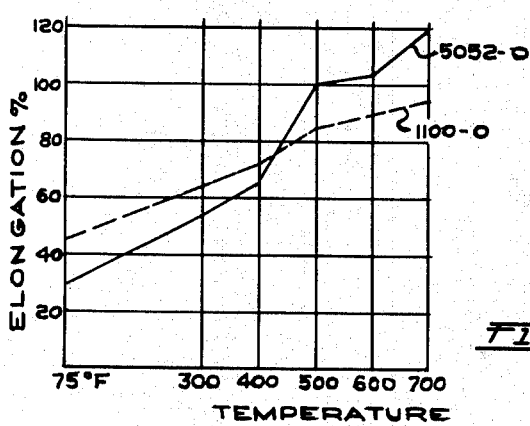
FIG. 5 is a graph showing the relationship of elongation and temperature of two materials suitable for use as layer materials in the composite.

Referring now to FIGS. 4 and 5, there is shown an example of the behavior of two representative metallic materials suitable for use as layer material in the above described composite. As shown therein the inner or core material may comprise the well-known wrought aluminum alloy 1100–0 which possesses a yield strength of about 5,000 p.s.i. at room conditions and the outer layer material may comprise the well-known wrought aluminum alloy 5052–0 which possesses a yield strength of about 13,000 p.s.i. at room conditions. Similarly, the 1199 alloy and the 5083 alloy mentioned in Example A above have yield strengths at room conditions of about 4,000 p.s.i. and 21,000 p.s.i. respectively. The chemical compositions of the above alloys are such as to provide a compatibility for bonding to each other with an interfacial bond which as a yield strength intermediate the yield strengths of the layer materials entering into that bond. Thus, the yield strength of the inner layer is less than that of either the bond or the layer to which the inner layer is so bonded.

The invention contemplates that the final hollow metal article may be fabricated either under room temperature or at an elevated temperature. Since the strengths and elongation of the layer materials are respectively decreased and increased under elevated temperatures, most fabrication will normally be conducted at such elevated temperatures since the practical advantages of smaller dies and lower holding and expansion pressures can thus be gained. Referring again to FIG. 4 this diminution of yield strengths between room temperature and the temperature of 700° F. is shown, the yield strength of the material forming the splittable inner layer being at all times lower than that of the material in the outer layers. Similarly, as seen in FIG. 5, the degree of elongation before rupturing of both such materials increases with increasing temperature. It will be noted that while the material forming the splittable inner layer will elongate more rapidly than the material forming the outer layers up to about a temperature in the range of 400–500° F., thereafter the elongation of the latter increases more rapidly with increase in temperature. Thus, the tenacity characteristic of the material in the inner layer to resist splitting apart is all the more apparent in the upper temperature ranges at which the hollow metal article is normally formed.

The above illustration of suitable aluminum alloys for use in this invention is not to be considered as requiring that they be employed in fabricating articles made by its teachings. As will be obvious to those skilled in the art other metals and alloys and combinations thereof such as copper, silver, stainless steel and titanium may be employed to carry out the teachings of the present invention.

Referring now to FIG. 1C, a roll 15 of composite stock as above described may be stored, shipped and regarded as any other separate article of manufacture. When the user then desires to form a hollow metal article therefrom, the roll is unwound and separate portions 20 of appropriate size are cut therefrom by any conventional severing means represented by the arrows 21. The severed portion may then be heated to an elevated fabricating temperature in a suitable oven 22, or alternately may be fabricated at room temperature. The heated or unheated portion 20 is then placed in a suitable press having dies 23 and 24, at least one of which has a configurated recess. After splitting apart of the inner layers by application of an expansion fluid pressure, that pressure application is interrupted, the dies are opened and the hollow metal article 25 is removed therefrom. This series of fabricating steps is further set forth in FIG. 1D, the dotted line thereof indicating the alternative practice of expanding the hollow article in unheated condition. In accordance with accepted practice, the expanded article 25 is annealed after leaving the press and prior to final finishing.

FIG. 2 illustrates one form of hydraulic means for expanding the hollow article, it being understood that many forms of expanding means and systems using either gases, such as air, nitrogen or water vapor or liquid such as water or oil under pressure may be employed without departing from the invention. From a reservoir 30 a fluid is drawn by a suitable pump 31 and forced into an outlet line 32 leading to a suitable inflation needle 33. This needle in turn is engaged in the edge of a portion 20 of the composite now resting in the press between dies 23 and 24 and confined thereby as indicated by the arrows. Inflation needle 33 moreover is securely engaged with edge portions 34, 35 of the sheet which have previously been separated in a suitable manner as by use of a needle or chisel. Conventional check valves, pressure indicators, controls, and drainage means also are employed in the hydraulic expanding means, all as known in the art. In carrying out the improved method for forming the hollow article, the dies 23 and 24 may have formed therein recesses 36, 37 of any desired pattern and configuration depending upon whether one-side or two-side expansion of the composite portion is to be made. Such recesses are indicated generally by the dotted lines in FIG. 2 and extend to the edge of the composite where the injection needle is inserted.

Figure 3:
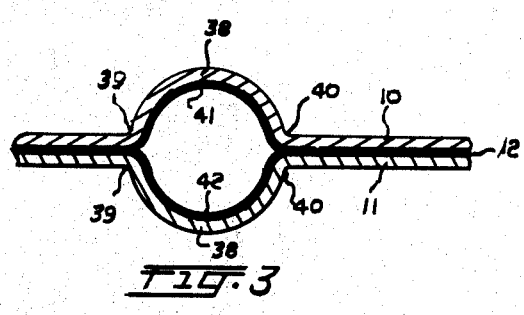
FIG. 3 is an enlarged detail view showing a portion of a finished article transversely of the hollow space therein.

As seen in FIG. 2A with the composite in place, when pump 31 forces fluid into the needle 33 it then passes into the inner layer 12 which, as aforementioned, tends to hold tenaciously to the companion layers 10 and 11, but has a lower strength than those layers. As the volume of fluid entering the layer increases, the inner layer then begins to split apart progressively. The progressive yielding of the inner layer then permits the outer layer 10, in FIG. 2B to elongate and stretch and to settle progressively into contact with the surface of recess 36. When the article is formed with the hollow recess it then will be found that the wall of the stretched layer 10 in the region 38, 39 and 40 is of substantially uniform thickness, with no necking-down of any consequences occurring at 39 and 40. This is an important feature of my invention and is characteristic of the improved hollow metal article made by the present teaching. Likewise, when two side expansion is carried out, as seen in FIG. 2C, the better in FIG. 3, the same phenomonon occurs. Also, as seen in FIG. 3, the inner layer 12 has split within itself and not at the bond zone, which, in effect, lines the hollow space with the material from layer 12. This occurs because the bond is stronger than the material in layer 12 since during the process of bonding, the metal was heated or otherwise treated either to achieve other purposes or solely to achieve bond strength during which time the original bond line was obliterated either by re-crystallization cross-linkage or by a diffusion of alloying ingredients from layers 10 and 11 to increase the strength of the metal from layer 12 which is in the bond zone or by both phenomena. In the case where aluminum alloys 1199 or 1100 are used as the inner layer and aluminum alloy 5052 or 5083 are used as the outer layers, the main diffusing ingredient is magnesium which is present in both the 5052 and 5083 alloy.

Whereas, in FIG. 3 the inner surface 41 and 42 resulting from the split appears to be smooth, it is actually rough which is of special value in refrigerator evaporators. In some cases such as in refrigerator condensers it is desirable that the surfaces on the interior be smooth. This may be accomplished by passing commercially available chemical brightening solutions through the hollow portion. These solutions preferentially dissolve away the peaks of the roughness rather than the valleys to smooth out the roughness. Instead of brighteners, an abrasive slurry can be passed over the rough surface, for example, abrasive alumina suspended in water to form a slurry may be pumped through the hollow areas until the peaks of the roughness are abraded away to the extent desired. Following either of the above methods of smoothing the rough surfaces, they are preferably cleaned by water and then dehydrated.

Figure 8:
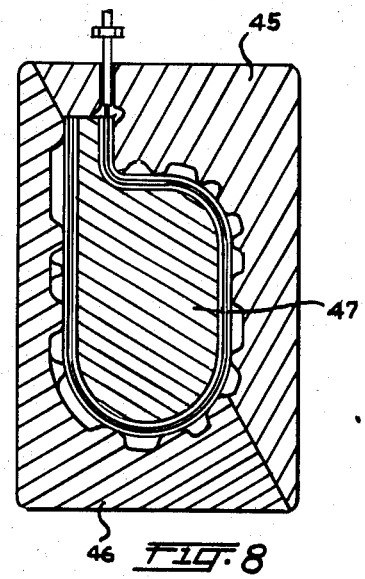
FIG. 8 is a view showing a non-planar composite in place within a different form of die and prior to expansion.

While usually the composite sheet is split apart and expanded while in the flat condition, the invention is particularly amenable for first forming the composite by stamping, bending, drawing or otherwise into a desired shape before placing the thus formed composite into a suitable die for expansion. For example, see FIG. 8 where the composite portion 20 has been suitably bent and disposed in die spaces between outer dies 45 and 46 for restricting expansion of one face of the composite and with an inner die 47 for restriction expansion on the other face of the composite.

As previously mentioned, the composite may be formed of two sheets 10 and 11 each clad with a layer 12, FIG. 6, as in the example given. Other variations of multilayer composites also may be used and in FIG. 7 one such is shown for use in two side expansion. Here a first outer layer 50 and a second outer layer 51 are used with a central layer 52 interposed therebetween, all of these layers comprising materials having relatively high yield strengths. On either side of the central layer a layer 53 and a layer 54 of a splittable material having a relatively low strength and bonded to the adjacent layers are provided. In expanding this form of composite two expanding needles would be employed, one of which enters into layer 53 and the other of which enters into layer 54.

*Example B*

As a further example of a means of practicing this invention, a product having a single straight hollow space therein which was 4" x 8" in area and 0.063" thick with the inner layer being of a thickness of about 17% of the thickness of the composite was desired and the following procedure was utilized. The starting sheets for the outer layers were composed of 5083-0 aluminum alloy 6" x 12" in area and 0.254" thick. As the inner layer, aluminum alloy 1160.0 was used having an area 6¼" x 12½" with a thickness of 0.070". The inner layer was larger than the outer layers so that there was an overlap and continuous bonding of their meeting faces. The thickness of the inner layer allowed for a roll-off factor of 25%. If no roll-off factor was required the thickness would only have been 0.053". All of the starting sheets were dry annealed at 750° F. for one hour and then allowed to cool to room temperature. The meeting surfaces of one outer sheet and one inner sheet were wire brushed to remove the oxide and reheated to 750° F. for hot roll bonding. The two sheets were then hot roll bonded together in two passes, the first pass causing a reduction of at least 50%, to reduce the composite thickness from .324" to .205" while simultaneously causing a solid phase bonding of the two sheets together. The rolling direction was chosen to widen 6-inch widths to 9 inches. During the remainder of the rolling, the direction was 90° to this initial bonding direction. This composite was then heated to 750° F. and hot rolled in two passes to .100", the first pass reducing the thickness to .145". The size of the composite at this stage was approximately 9" x 24½" and was trimmed to a size 5¾" x 8⅛". Two of the panels of this size were then dry annealed at 750° F. for one hour and then allowed to cool to room temperature. The 1160 aluminum side of each of these panels were cleaned by wire brushing and placed together so that the wire brushed surfaces were in contact with one another. The panels were held together by two tack welds on the leading edge and one tack weld on the trailing edge. This composite was then heated to 750° F. and hot rolled bonded together by two passes through the rolls which reduced the thickness to .145". The composite was then reheated to 750° F. and hot rolled in two passes to a final thickness of .063", the first pass reducing the thickness to .073". The final size of the composite was approximately 8½" x 18¼". The composite was then annealed to 750° F. for one hour following by cooling to room temperature. The composite was then trimmed to panels 4" x 8" and one of these panels had its edge opened by a metal needle. A hollow expansion needle was then tightly inserted into this opening. The panel and expansion needle were then placed into the dies as shown in FIG. 2 which applied a pressure of 70,000 pounds and were heated to 600° F. by means of electric resistance heaters accurately controlled by thermostats. Adjacent the dies were clamping jaws (not shown) which coined the composite around the needle into tight engagement therewith. The needle was then connected to a pressure source and light petroleum oil was applied therethrough under a pressure which was gradually raised from atmospheric pressure to 10,000 pounds per square inch. Afterwards, the expanding pressure was reduced to atmospheric pressure, the dies were opened, the panel were removed, the needle was removed from the panel, and the panel was cooled to room temperature. The panel has a hollow space therein on the upper side which was .090" high and the bottom side opposite the hollow space was perfectly flat except for a short portion adjacent the needle which was deliberately expanded. The inside surface roughness was 375 R.M.S. and the exterior roughness was 13 R.M.S.

Numerous modifications of the described processes may be employed. For example, if it is desired to cut from an elongated stock of composite all portions of equal size, then spaced short layers of stop-weld material projecting inwardly from a lateral edge of the composite could be provided to make an easier entrance for the inflation needle later to be used. It also will be understood that the entire expansion of the composite need not be limited to only one set of dies, that is, the hollow space can be initially formed in one set of dies, the partially expanded article then placed in one or more subsequent sets of dies and the space enlarged to final size therein.

While the present invention is of prime importance in connection with the manufacture of refrigerator evaporators, it is also of great importance in other areas as well. For example, the invention may be used for making tubing, baseboard radiators, radiant heating panels for ceiling or walls or buildings, rigidized structural panels, floatable sheets for marine applications, containers, plumbing assemblies, decorative panels, and numerous other applications. When desired, a material such as foamed plastics may be incorporated in the hollow spaces for strengthening same, when the invention is used for structural purposes.

To further define some of the information contained herein, the following is set forth. The abbreviation "p.s.i." means "pounds per square inch." The aluminum alloys are designated by the standard method in use in the United States of America. Aluminum alloys 1100, 1160, and 1199 refer to aluminum having a minimum purity of 99.00% and 99.99% respectively, the remaining constituents being impurities. Aluminum alloy 5052 is commercially pure aluminum having as alloy additional thereto about 2.5% magnesium and about 0.25% chromium. The 5083 aluminum alloy is commercially pure aluminum that has as alloy additions thereto about 0.75 manganese and about 4.5% magnesium. The designation "O" following the alloy number simply means that the metal is fully annealed. As used herein, the term "rough" refers to a surface roughness of over 50 R.M.S. "R.M.S." means "root means square" which is a measure of surface roughness whereby the difference in height between a peak and a valley in microinches is squared and after a number of these readings are obtained they are added together and then divided by the number of readings. The square root is then taken of this figure to give the R.M.S.

As a rule, the inner layer is formed of an alloy having a higher purity than the alloy employed in the outer layers. Also, it is preferable that the inner layer be of a material which is higher melting than the material used to form the outer layers. Thus, there is actually a splitting in a solid layer rather than a splitting in a liquid layer such as in Rieppel Patent 2,779,086.

Obviously, many modifications and variations of the present invention are possible in the light of the above teachings. It is therefore to be understood that within the scope of the appended claims, the invention may be practiced otherwise than as specifically described.

What is claimed is:

1. The method of forming an article having a hollow passageway therein which comprises providing a multi-layer sheet of metallic material having first and second layers with an inner solid splittable layer disposed therebetween and metallurgically bonded thereto, said inner layer being weaker than the first and second layers so that said inner layer may be split to form said hollow passageway, confining said multi-layer sheet between a pair of holding dies which restrain said sheet against expansion except in the area where said hollow passageway is desired, and introducing a fluid under pressure into said inner layer while maintaining said inner layer solid to cause splitting of said solid inner layer and formation of said hollow passageway progressively throughout the area desired until further splitting is restrained by said dies, said inner layer remaining in the solid state during introduction of said fluid and splitting of said layer.

2. The method of claim 1 wherein said sheet is expanded while at an elevated temperature.

3. The method of forming an article having a hollow passageway therein which comprises providing a composite sheet having first and second layers bonded to an inner solid splittable aluminum layer disposed therebetween, said inner layer being weaker than the first and second layers so that it may be split to form said hollow passageway, without disrupting the bond between said inner layer and the adjoining layers in other parts of the sheet; confining said composite sheet between a pair of holding dies which restrain said sheet against expansion except in the area where said hollow passageway is desired, and introducing a fluid under pressure to said inner layer to cause splitting of said solid inner layer and formation of said hollow passageway progressively throughout the area desired until further splitting is restrained by said dies, said inner layer remaining in the solid state during introduction of said fluid and splitting of said layer.

4. In the method of forming a refrigerator evaporator having a fluid passageway therein from a multilayer sheet of metallic material, the improvement which comprises casting first and second layers of metallic material about an inner layer of higher melting metallic material whereby a diffusion bonding zone between said layers will result, said inner layer being weaker than said bonding zones and said first and second layers so that said inner layer may be split in the solid condition without disrupting said zones and other layers, pressure rolling to reduce the thickness of the layers and form a composite sheet therefrom, confining the resulting sheet between a pair of holding dies which restrain said sheet against expansion except in the area where said hollow passageway is desired, and introducing a fluid under pressure into said inner layer to cause splitting of said inner layer and formation of said hollow passageway progressively throughout the area desired until further splitting is restrained by said dies, said inner layer remaining in the solid state during introduction of said fluid and splitting of said layer.

5. In the method of forming a refrigerator evaporator having a fluid passageway therein from a multilayer sheet of metallic material, the improvement which comprises providing first and second layers of metallic material and an inner layer of higher melting metallic material, said inner layer being weaker than said first and second layers so that said inner layer may be split in the solid condition without disrupting the others, pressure rolling to reduce the thickness of the layers and form a composite sheet therefrom, said first and second layers being solid phase metallurgically bonded to said inner layer during the reduction thereof by rolling, confining the resulting sheet between a pair of holding dies which restrain said sheet against expansion except in the area where said hollow passageway is desired, and introducing a fluid under pressure into said inner layer to cause splitting of said inner layer and formation of said hollow passageway progressively throughout the area desired until further splitting is restrained by said dies, said inner layer remaining in the solid state during introduction of said fluid and splitting thereof.

6. In the method of forming a refrigerator evaporator having a fluid passageway therein from a multilayer sheet of metallic material, the improvement which comprises providing first and second layers of aluminum alloys containing magnesium and an inner layer of substantially pure aluminum, said inner layer being weaker than said first and second layers so that said inner layer may be split in the solid condition without disrupting the others, pressure rolling to reduce the thickness of the layers and form a composite sheet therefrom, confining the resulting sheet between a pair of holding dies which restrain said sheet against expansion except in the area where said hollow passageway is desired, and introducing a fluid under pressure into said inner layer to cause splitting of said inner layer and formation of said hollow passageway progressively throughout the area desired until further splitting is restrained by said dies, said inner layer remaining in the solid state during introduction of said fluid and splitting thereof, said method including the step of heating the layers whereby the magnesium diffuses from the first and second layers partially into the inner layer.

References Cited by the Examiner

UNITED STATES PATENTS

| | | | |
|---|---|---|---|
| 1,709,865 | 4/1929 | Muffly | 29—157.3 |
| 1,865,089 | 6/1932 | Dix | 29—197.5 |
| 2,122,535 | 7/1938 | Nock | 29—197.5 |
| 2,312,039 | 2/1943 | Hoglund | 29—197.5 |
| 2,383,511 | 8/1945 | Reynolds | |
| 2,490,919 | 2/1949 | Bodine | 51—317 X |
| 2,779,086 | 1/1957 | Rieppel | 29—157.3 |
| 3,004,329 | 10/1961 | Peterson et al. | 29—157.3 |
| 3,018,543 | 1/1962 | Beck | 29—157.3 |

FOREIGN PATENTS

| | | |
|---|---|---|
| 521,835 | 2/1956 | Canada. |
| 581,113 | 7/1933 | Germany. |

WHITMORE A. WILTZ, *Primary Examiner.*

JOHN F. CAMPBELL, *Examiner.*